July 2, 1940.   J. V. CAPUTO   2,206,497
WELDING APPARATUS
Filed April 4, 1938
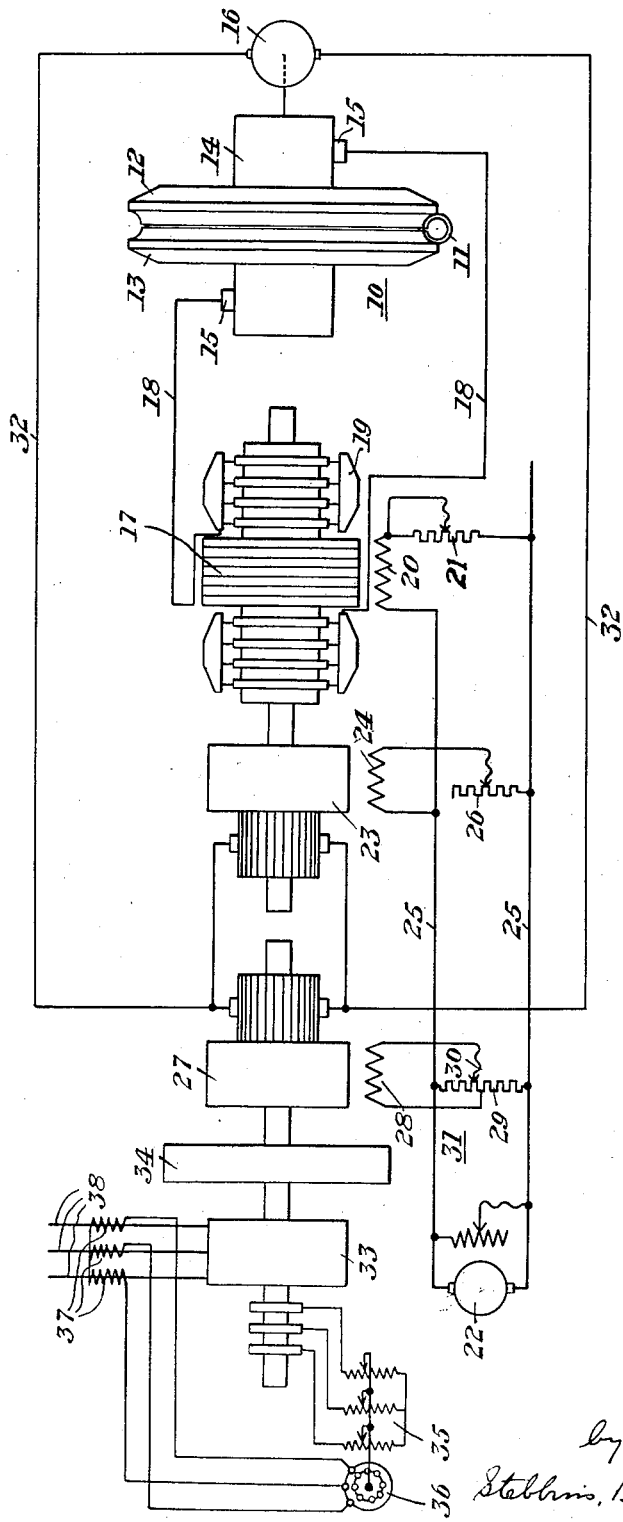
INVENTOR
James V. Caputo
by his attorneys
Stebbins, Blenko & Parmelee Patented July 2, 1940

2,206,497

UNITED STATES PATENT OFFICE 2,206,497

WELDING APPARATUS

James V. Caputo, Crafton, Pa.

Application April 4, 1938, Serial No. 199,839

5 Claims. (Cl. 219—6)

This invention relates in general to the art of welding and, in particular, to the progressive electric resistance welding of longitudinally moving, abutting metallic plate edges of limited length, such as those defining a longitudinal seam cleft in a tube blank of cylindrical form.

In the progressive electric resistance welding of moving metallic plate edges of limited length, it is necessary to start the welding current after engagement of the edges with the current supply means (usually a roller contact electrode) and terminate the current before the edges depart therefrom. In the case of alternating current welders, this is usually accomplished by a control switch in the high voltage side of the transformer supplying welding current. In direct current welding apparatus, the current is usually controlled by varying the excitation of the generator which supplies the current. In either case, the equipment required is relatively expensive both from the standpoint of initial cost and upkeep and the maintenance requirements are such that it is sometimes necessary to shut-down the entire welding mill to make repairs or replacements. Failure of the current control apparatus during a welding operation is even more serious and introduces the possibility of serious injury to other equipment.

Homopolar generators have been employed to supply direct current welders but have been found very slow to respond to changes in excitation, so that a circuit breaker in the main welding circuit is required to control the current.

I have invented a novel method of controlling the welding current which overcomes the aforementioned objections to the methods heretofore practiced. In accordance with my invention I control the welding current by accelerating or decelerating the generator supplying such current, the acceleration and deceleration being timed relative to the travel of successive tube blanks so that the flow of welding current across the seams thereof will not be initiated until after the blank has engaged the electrode but will be terminated before the blank has departed therefrom. I preferably employ a homopolar generator for supplying welding current because such generator is particularly adapted to deliver a large current at a relatively low voltage. I provide a variable speed motor for driving the welding generator and also a control generator for applying a variable voltage to the motor driving the welding generator. The control generator I preferably drive by a substantially constant speed motor or any other convenient means.

A complete understanding of the invention may be gained from the following description thereof which is to be read in connection with the accompanying drawing, the single figure of which illustrates diagrammatically the apparatus which I prefer to employ in the practice of my invention. Referring now in detail to the drawing, I have illustrated twin disk electrode 10 as typical of means for supplying welding current to a blank 11 although it is to be understood that the invention is also applicable to welders using other forms of current supply means, as well as to apparatus for welding articles other than pipe blanks. The electrode 10 comprises disks 12 and 13 mounted for rotation about a common axis and having hubs 14 with which brushes 15 cooperate. The disks 12 and 13 may conveniently be mounted on a common shaft if appropriately insulated from each other. I prefer to drive the electrode 10 by a motor 16 through any suitable form of driving connection.

Welding current is supplied to the electrode 10 from a welding generator 17 which I have illustrated as a generator of the homopolar type although other types of generators may also be employed and may be of the alternating current type as well as the direct current type. Connections 18 extend from the brush arms 19 of the generator 17 to brushes 15 of the electrode. The brush arms 19 are provided with brushes cooperating with collector rings on the rotor of the generator 17. A field winding 20 mounted on the yoke or core of the generator provides excitation for the latter. It is connected in series with a control rheostat 21 across buses extending from an exciter generator 22 which may be driven by any convenient means.

A motor 23 drives the generator 17 and may be directly connected thereto as indicated. The motor 23 is preferably a variable speed, direct current motor and has a field winding indicated at 24 which is also connected across the exciter bus 25 in series with the control rheostat 26. The speed of the motor 23 may be varied, of course, by varying the voltage applied thereto or the setting of the rheostat 26 which controls the excitation of the motor field.

Current for driving the motor 23 is supplied thereto by a control generator 27. The generator 27 is a direct current generator of any suitable type having a field winding 28. While the motor 23 and generator 27 have been illustrated as direct current machines, it will be apparent that alternating current machines may be used instead. The advantage of ease of speed control seems to rest with the direct current machines.

One terminal of the winding 28 of the generator 27 is connected to the middle point of a resistor 29 while the other end is connected to movable contact 30 cooperating therewith to define a potentiometer. The resistor 29 is connected across the bus 25. By means of the potentiometer indicated generally at 31, it is possible to vary the magnitude, as well as the polarity of the exciting current traversing the winding 28, by merely adjusting the contact 30.

The generator 27, in addition to supplying current to the motor 23, is also connected to the motor 16 which drives the electrode 10, by connections 32.

The generator 27 is driven by a motor 33 which may conveniently be directly connected thereto. A fly-wheel 34 may be mounted on the shaft connecting the motor 33 and generator 27 whereby a substantially constant speed of the latter is maintained. The motor 33 is preferably of the substantially constant speed type such as an alternating current induction motor and may be provided with speed control means such as a polyphase rheostat 35 for controlling the resistance in the secondary circuits. I provide means for automatically adjusting the rheostat 35. These means take the form of an operating motor 36 for the rheostat and a current transformer 37 connected thereto, the primary of the transformer being one of the polyphase leads 38 extending to the stator of the motor 33 from any convenient power source.

The method of my invention will now be explained by describing the operation of the apparatus which has been referred to hereinbefore. It will be understood, however, that the apparatus disclosed is merely by way of example since the method of my invention may also be performed by apparatus other than that shown.

Under normal conditions, i. e., before a pipe length has been advanced to engage the electrode 10, the motor 33 is running at normal speed driving the generator 27. The contact 30 of potentiometer 31 is positioned as illustrated so that the field of the generator 27 is substantially unexcited. Under such conditions, of course, little or no output is delivered by the generator 27. The motors 16 and 23, therefore, will be either stationary or turning over at relatively low speed. The generator 17, therefore, develops little or no voltage across its terminals.

If a tube blank such as that shown at 11 is now advanced into engagement with the electrode 10 the welding of the longitudinal seam thereof may be effected by operating the contact 30 of potentiometer 31 from its neutral or center position toward one of its extreme positions. Since the generator 27 is normally driven at a speed for which it is designed, the terminal voltage thereof increases with the excitation. The increased excitation of the field of the generator 27 which is effected by movement of the potentiometer contact toward either one of its extreme positions causes the generator 27 to supply current to the motors 16 and 23. The latter are thus accelerated from rest or relatively low speed substantially to their full operating speeds. The electrode 10 thus acquires a peripheral speed equal to the linear speed of the blank 11. At the same time, the acceleration of the generator 17 caused by the starting and acceleration of the motor 23, causes the terminal voltage of the generator 17 to build up, whereupon current flows to the disks 12 and 13 of the electrode and thence across the seam cleft in the blank. The edges of the cleft are thereby heated to welding temperature and may then be welded by appropriate side pressure rolls in the known manner.

The adjustment of the contact 30 of the potentiometer may be effected manually or automatically. By means of a suitable motor and control mechanism, the advancement of a blank toward the electrode may be caused to start the series of operations necessary to put the system in condition for welding, at the proper time relative to the engagement of the electrode by the blank, to insure that as soon as this engagement has occurred, substantially full welding current will be supplied to the cleft edges. While the inertia of the rotating parts of the system disclosed is considerable, the design and control of electric machines has progressed to such an extent that it is possible to accelerate even large machines from rest to substantially normal speed within a surprisingly short time.

The reverse of the above described operation is effected just before the trailing end of the blank departs from the electrode. The contact 30 is moved back to its neutral position or slightly beyond, if desired, to insure a prompt reduction of the voltage developed by the generator 27 and stoppage of the motor 23 with a consequent termination of the welding current supplied to the electrode by the generator 17. This operation of the potentiometer contact may also be effected manually or automatically. The motor 16 is decelerated along with the motor 27 and the entire system returns to its normal condition.

The reduction in the speed of the electrode between successive welding operations is found to be quite desirable in providing a fluid-tight weld of the abutting edges of the cleft in the blank clear up to substantially the extreme ends of the blank. The fly-wheel 34 tends to prevent extreme variations in the speed of the motor 33 by storing sufficient energy to maintain the appropriate speed of the generator 27 despite sudden applications of load to the latter. The motor driven rheostat 35 operates to permit a slight decrease in the speed of the motor 33 sufficient to cause the fly-wheel 34 to give up energy when the load is applied to the generator 27. Under such conditions, of course, the current supplied to the motor 33 is increased. This increase of current, through the transformer 37, causes the motor 36 to operate the rheostat 35 so that the motor 33 tends to operate at a slightly reduced speed. As soon as the current input to the motor 33 is reduced to normal, the motor 36 returns the rheostat 35 to its normal position.

It is desirable to reverse the polarity of the welding current at intervals. My invention provides convenient means for accomplishing this result in that the polarity of the excitation of the field winding 28 of the generator 27 depends on whether the potentiometer contact 30 is moved up or down from its neutral position. Reversal of the polarity of the generator 27, of course, reverses the direction of rotation of the motor 23 and generator 17, thus reversing the polarity of the latter. Any convenient means may be provided for simultaneously reversing the excitation of the motor 16 to prevent reversal thereof.

It wil be apparent from the foregoing description and explanation that the invention provides simple yet effective and easily controlled means for initiating and terminating the welding current employed to weld longitudinally moving plate edges of limited length, as well as for reversing the polarity of the current as desired. The invention eliminates two serious objections to control systems previously used. The first of these is the cost and upkeep of a control switch in the main welding circuit. The second is the delay experienced when it is attempted to control welding current by varying the excitation of the field of welding generators. In addition to varying the voltage applied to the motor driving the welding generator, I may also vary the excitation of the motor itself to cause a further variation in the speed of the generator. By increasing the excitation of the motor 23, for example, when approaching the end of a blank, the motor is decelerated causing it to deliver energy to the generator 27 driving it as a motor and causing the generator 27, operating as a motor to drive the motor 33 as a generator.

A considerable reduction in the wear on the brushes and collector rings of the generator is effected by stopping it between welding operations.

Although I have illustrated and described herein but a preferred embodiment and practice of the invention, it will be understood that changes in the apparatus and procedure disclosed may be made without departing from the spirit of the invention or the scope of the appended claims.

I claim:

1. Apparatus for welding the longitudinal edges of a seam cleft in a tube blank comprising an electrode progressively engaging the seam edges, means for supplying variable current to the electrode including a generator and a variable-speed drive therefor, and means for accelerating the electrode and said generator at coordinated rates, to heat the edges to welding temperature.

2. In an electric welder, current-supply means including a generator for supplying current to said welder, a motor for driving the generator, means for progressively engaging the work as it advances, an auxiliary motor for driving said means, a second generator supplying current to the motor for driving the welding generator and the motor for driving said means, and a control system for varying the excitation of said second generator to vary the welding current and the speed of said means.

3. In an electric welder, current-supply means including a generator for supplying current to said welder, a motor for driving the generator, means for progressively engaging the work as it advances, an auxiliary motor for driving said means, a second generator supplying current to the motor for driving the welding generator and the motor for driving said means, a control system for varying the excitation of said second generator to vary the welding current and the speed of said means, a third motor driving said second generator, speed-control means for said third motor, and means responsive to an increase in the load on said third motor for so adjusting said speed-control means as to lower the speed of the third motor.

4. In an electric welder, current-supply means including a generator for supplying current to said welder, a motor for driving the generator, means for progressively engaging the work as it advances, an auxiliary motor for driving said means, a second generator supplying current to the motor for driving the welding generator and the motor for driving said means, a control system for varying the excitation of said second generator to vary the welding curent and the speed of said means, a third motor driving said second generator, speed-control means for said third motor, and means responsive to a decrease in the load on said third motor for so adjusting said speed-control means as to increase the speed of the third motor.

5. The combination with progressive electric welding mechanism and a generator connected thereto for supplying welding current, of a variable-speed motor driving said generator, a variable-voltage generator connected to supply current to said motor, and a motor for driving said mechanism also connected to said variable-voltage generator.

JAMES V. CAPUTO.